July 1, 1930.  R. W. SNYDER  1,769,720
RIMMING PRESS
Filed July 11, 1925  2 Sheets-Sheet 1

INVENTOR
Robert W. Snyder,
BY
ATTORNEY

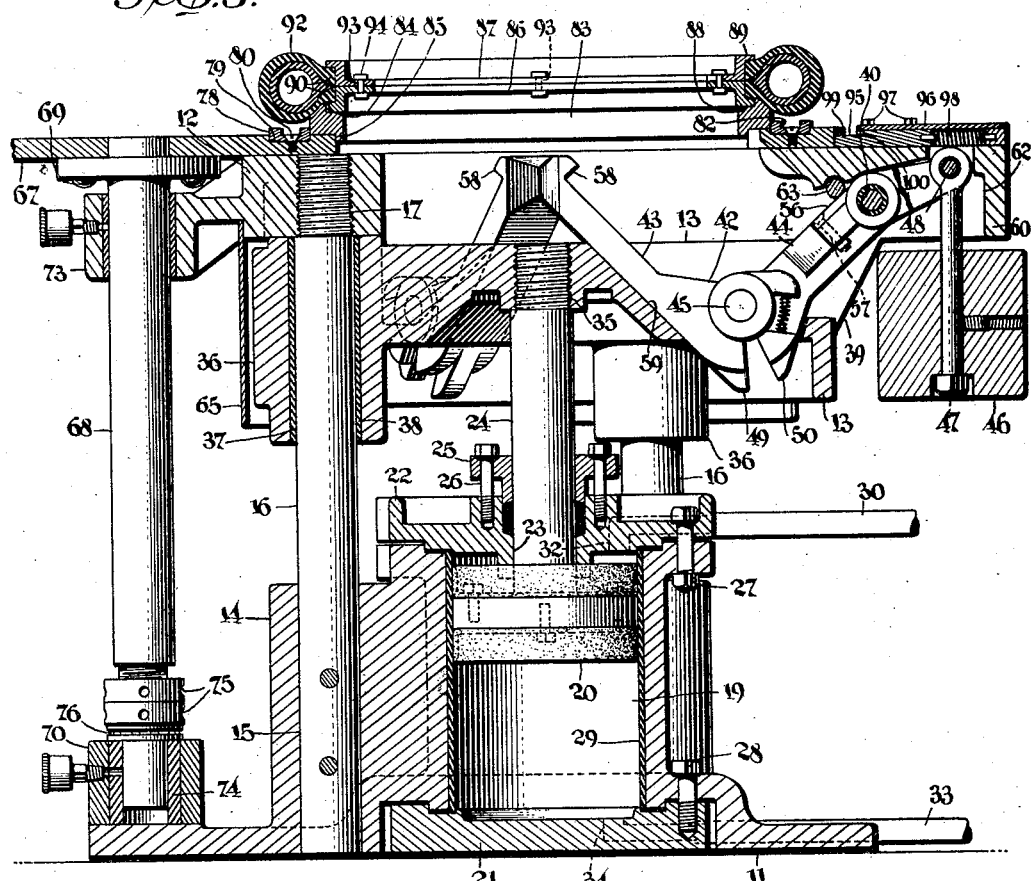
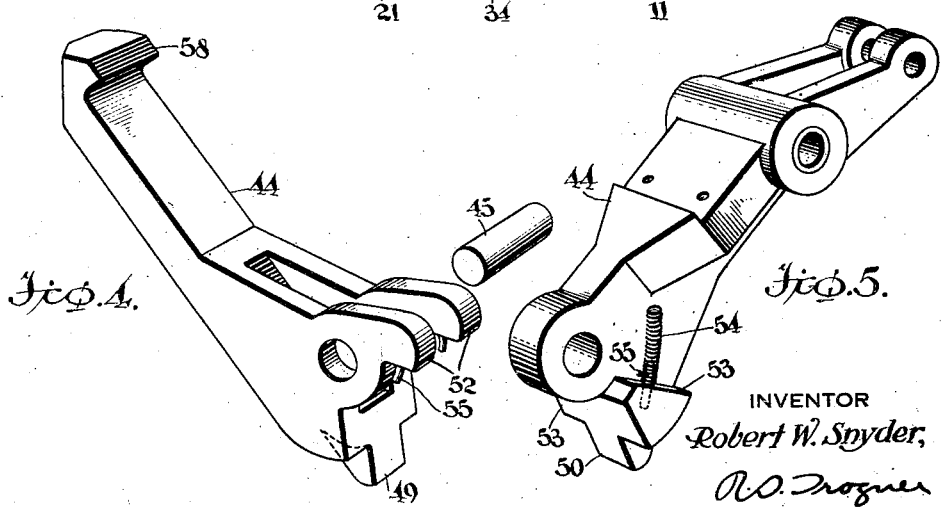

Patented July 1, 1930

1,769,720

UNITED STATES PATENT OFFICE

ROBERT W. SNYDER, OF AKRON, OHIO, ASSIGNOR TO THE GOODYEAR TIRE & RUBBER COMPANY, OF AKRON, OHIO, A CORPORATION OF OHIO

RIMMING PRESS

Application filed July 11, 1925. Serial No. 43,047.

My invention relates to presses and it has particular relation to an improved rimming press adapted to be employed for the purpose of applying rims to automobile tire casings, preparatory to subjecting them to vulcanization in curing molds.

One object of my invention is to provide a press which will permit of mounting tires and rims thereon preparatory to clamping them and without interference from the clamping mechanism of the press.

Another object of my invention is to provide a press which has a stationary horizontal surface for supporting tires to be rimmed and in which the clamping elements are adapted to disappear below the surface as the clamping operation takes place.

Another object of my invention is to provide a press so constructed that the speed of rimming tires is increased and the labor incident to the operation thereof is materially reduced as compared with the operation of the presses known heretofore.

Another object of my invention is to provide a press operated by fluid pressure and so constructed that movement in one direction of a fluid actuated instrumentality serves to engage clamping rims and press them together over the bead portions of an automobile tire.

Still another object of my invention is to provide a rimming press adapted to have incorporated therewith a device operating in conjunction with the press and permitting one set of tires and rims to be prepared for clamping operation while another set is being clamped together.

Heretofore in the manufacture of automobile tires, various forms of presses have been employed for the purpose of securing metal rims upon green tire casings containing air bags in order to close the bead portions thereof, thus preparing them for insertion into curing molds where the casings are vulcanized. When an airbag is inserted in a green or uncured casing, the latter is so distorted that the bead portions are generally excessively separated until rims are placed over the beads and drawn together, thereby bringing the beads to the desired relative position and at the same time confining the airbag snugly within the casing.

Presses have been developed upon which a tire rim and casing may be mounted and various forms of actuating arms have been incorporated in the press for the purpose of engaging the rims and clamping them together. In the previously utilized presses, in some instances, a supporting platform for the casing and rims is movable vertically and arms extend in spreading relationship through the openings in the platform during downward movement thereof, the arms engaging the rims during the upward movement of the platform to clamp them together. The disadvantages of working at different levels in handling more or less heavy tires and rims and adjusting them over the press has lead to an endeavor to develop improvements which will increase the speed of production and simplicity of operation of presses.

Another type of press has also been developed for providing a stationary platform with rim-clamping arms extending therethrough. But the difficulty of preventing the clamping arms from interfering with the workmen in handling the casings and rims and the difficulty of eliminating the delay incurred in operating the arms or adjusting them, have presented additional problems which my invention aims to remedy.

A press embodying the principles of my invention consists of a platform secured to a suitable frame and provided with fluid pressure operating means which carries a plurality of arms normally positioned below the surface of the platform. These arms are pivoted to a spider-member forming a part of the fluid operating means and are adapted to extend through an opening in the platform to engage rims in such manner that the latter are clamped together against the bead portions of a tire. The mountings for these arms are so arranged that upon movement of the spider-member in a downward direction, one end of each of the arms moves upwardly and then downwardly to effect the clamping operation of the rims against the bead portions of a tire casing. As soon as the clamping action has been consummated and the rims fastened together, the arms are released and they disappear below the surface of the platform.

The structure of the rimming press is such that it is adapted to have incorporated therewith a horizontally movable device which forms a support for the tires and rims after they are mounted thereon preparatory to the clamping operation. A device of this nature and of the type incorporated in my press is more fully described in a copending application of Leslie E. Dougherty, Serial No. 23,721, filed April 16, 1925, and assigned to The Goodyear Tire & Rubber Company. This device makes it possible to prepare one set of tires and rims while another set is being clamped together by the arms of the rimming press. The arms being normally below the surface of the press platform, they do not interfere in any way with movement of the device above mentioned or with placing tires and rims on or removing them from the press.

For a more thorough understanding of my invention, reference may now be had to the accompanying drawings, forming a part of my specification, of which:

Fig. 3 is a cross-sectional view, on a larger scale, taken substantially on the line III—III of Fig. 2;

Fig. 4 is a detail view showing the structure of parts of rim engaging arms employed in my rimming press; and Fig. 5 is a detail view, similar to that shown in Fig. 4, illustrating another part of the rim engaging arm.

Figure 2:
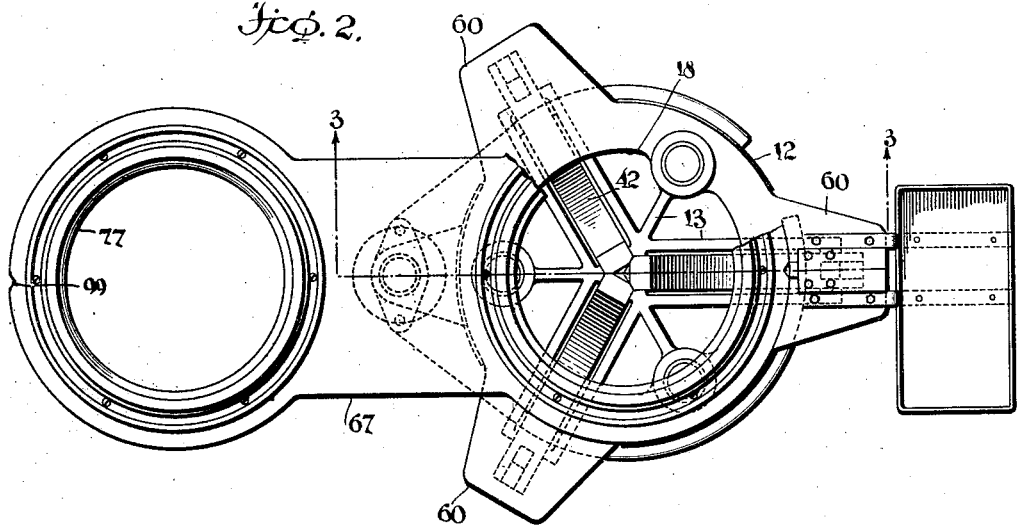
Fig. 2 is a plan view of the press shown in Fig. 1, parts being broken away.

In practicing my invention, I have embodied the principal features thereof in a press generally indicated by the numeral 10, which includes a foundation or base member 11, a substantially horizontal platform 12 and a fluid-actuated spider-member 13 for supporting parts of the operating mechanism.

The base member is provided with an integral raised portion 14 having cylindrical openings 15 therein for the purpose of receiving a plurality of upright supporting legs 16 upon which the platform 12 is mounted. These legs may be threaded into the platform, as indicated at 17, or secured thereto in any other suitable manner, and are disposed at intervals about a substantially circular opening 18 in the top of the platform.

At the central portion of the base member a comparatively large hollow portion is located which forms a cylinder 19. The cylinder serves as a container for a fluid actuated piston 20 and is closed at its lower end by a cap member 21 and at the other end by a cap-member 22 provided with a circular opening 23 through which a piston rod 24 for the piston is adapted to operate. The upper cap-member is provided with the usual stuffing-box 25 held in position by means of bolts 26 threaded into the upper cap member. The upper and lower cap-members are respectively secured in position by means of bolts and nuts 27 and 28, to form fluid-tight closures with respect to the cylindrical opening 19.

The inner surface of the cylinder is provided with a cylindrical bushing 29 serving as an efficient bearing against which the piston operates. In order to transmit a suitable power for actuating the piston 20 in a downward direction, a pipe 30, connected to a suitable supply of fluid under pressure, communicates with the interior of the cylinder 19 through the upper cap member, as indicated at 32. Likewise the piston is raised by admission of fluid under pressure through a pipe 33 which communicates with the cylinder through an opening 34 in the lower cap-member. By alternate admission of fluid under pressure into the pipes 30 and 33, the piston rod is moved downwardly and upwardly carrying therewith the spider-member 13 which is screw-threaded to the piston, as indicated at 35. The spider is provided with a plurality of projecting members 36 having cylindrical openings 37 therein, each of which is adapted to slide upon and be guided vertically by the legs 16 supporting the platform. Suitable bushings 38 are placed within the cylindrical openings for the purpose of compensating for wear.

The spider-member is formed with a plurality of integral forked bracket members 39, each of which is provided with a pivot pin 40 for pivotally supporting an arm 42. As the arms 42 are identical, as well as their connections, description of one of them will suffice for a thorough understanding of their construction and function.

As illustrated in Fig. 3, the arm 42 is constructed in two sections 43 and 44 pivoted together upon a bolt 45 substantially centrally of the entire length of the arm. The section 44 of the arm pivoted in a bracket member 39 is provided at its outer end with a weight 46, the latter being suspended upon a bolt 47 connected at the outer end of the arm, as indicated at 48.

Adjacent the pivot point forming the joint between the sections of the arm, two lugs 49 and 50 are formed which are adapted to engage each other and limit the pivotal movement of the sections of the arm as the latter tends to become elongated.

By reference to Figs. 4 and 5, it will be seen that one of the sections is provided with lugs 52 and the other section is formed with similar opposed lugs 53, separated from the first named lugs by means of coil springs 54 normally under compression and held in place by means of pins 55. These springs tend to move the sections of the arms about the pivot 45 with respect to each other so that their abutments 49 and 50 contact with each other when the arm is in its elongated position. Adjacent the pivot bolt 40 a hardened wear plate 56, adapted to be replaced, is secured flush with the surface of the arm 44 by means of bolts 57. The inner ends of the arms 42 are provided with hooked portions 58 which in normal position nest together adjacent the top of the spider-member, the sections of the arms resting upon the inclined surfaces 59 of the spider-member.

Directly above each of the bracket members and outer ends of the arms and integral with the platform, I have provided a plurality of projecting portions 60, each of which is formed with an under-cut cavity 62 adapted to receive the outer end of the section 44 of the arm in abutting relationship. A bolt 63, formed of hardened metal, is horizontally disposed within each of the openings 64 in the projecting members and is adapted to engage a correspondingly located wear plate 56 of the sectional arms, as shown in Fig. 3. It will be seen from this construction that as soon as the piston begins to move downwardly, the weights 46, which are heavier than the arms, pivot the latter about the pins 40 and actuate the hooks of the arms upwardly through the opening 18 in the platform in such manner that they extend above the platform, and thereafter begin downward movement as the piston continues its downward movement.

As a protective covering, a sheet 65 of relatively thin metal is disposed around the press and secured to the platform in encircling relationship.

A device for handling tires and rims, generally indicated by the numeral 66, includes a table 67 of oblong conformation provided with a shaft 68 secured at one end to a central portion of the table by means of bolts or rivets 69, and at the other end it is mounted in a bearing 70 secured by means of bolts 72 to the base member carrying the rimming press. Adjacent its upper end, the shaft is journalled in a bearing member 73 secured to or integral with the press. It is evident from this construction that a bearing may be formed for the upper end of the shaft integral with or secured to the oblong table instead of the shaft itself being rigidly secured thereto. A bushing 74 is disposed in the bearing 70 and adjustable nuts 75 screw-threaded adjacent the lower end of the shaft 68 are provided with roller or ball bearings 76 for facilitating rotative movement of the shaft. By manipulating these nuts, the table may be vertically adjusted in order that it may be adapted to be positioned immediately over the top surface of the platform 12, and to come in contact therewith when pressure is applied to rims carried on the table.

At each end of the oblong table, a circular opening 77 is provided which is flanked by a ring 78 fitting snugly in a groove 79 formed in the surface of the table. This ring is secured to the table by means of suitable screws 80. It will be apparent from this structure that the table may be machined or cast with this ring formed thereon, or welding may be employed to secure a separate ring to the table. The upper surface of the ring 78 is grooved, as indicated at 82, the bottom of the groove being substantially in the same horizontal plane as the surface of the table. A removable ring 83 is formed with an angular depression 84 on one side, with a circumferential rib 85 on the other side and is adapted to lie upon the surface of the table in such position that one edge will abut one side of the ring 78 and the rib will fit into the circular opening of the table. Other rings of various sizes may be held in place against the other side of the ring 78 and in the groove 82 in order that various sizes of rims utilized in rimming tires of different dimensions and types may be employed.

Referring again to Fig. 3, it will be seen that two rim members 86 and 87 are provided with flanges 88 and 89 which engage the bead portions 90 of a tire casing 92 and when the rims have been brought together, the beads of the tire are engaged. The rims are provided with elongate openings 93 which are adapted to register with each other to receive T-bolts 94 which are inserted by hand and a half-turn applied thereto to maintain the rims secured together.

When the table is swung to the position shown in Fig. 3, it is yieldably retained in registering relationship with the opening in the top of the platform by means of a spring pressed plunger 95 which is slidably mounted in a box like container 96 secured to the platform by means of bolts 97 and in which a coil spring 98 is disposed. The end of the plunger is adapted to engage a notch 99 in each end of the oblong table 67 and to maintain the table opening registering with the opening in the top of the platform 12. The plunger is provided with a stop shoulder 100 which prevents it from extending beyond the desired position as the table is swung out of contact therewith. The table may be released from the registering position by manually pushing the free end thereof whereby it is rotated about the shaft 68.

Figure 1:
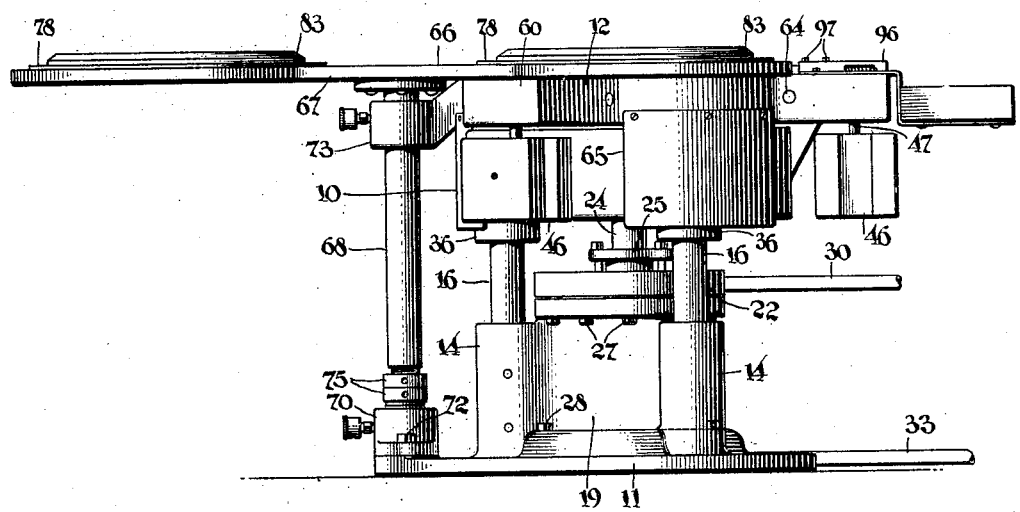
Fig. 1 is an elevational view of a rimming press constructed in accordance with the principles of my invention.

In the operation of my rimming press, the first metal rim 86 is positioned upon the ring 83, as indicated in Fig. 3, and the tire casing is then placed over the rim with the bead portions thereof engaging the flange 88 of the rim. The second rim 87 is then placed over the top of the tire and the rims are ready to be clamped together. The rims and tires which are to be clamped are consecutively placed in this position upon the end of the table extending away from the press, as illustrated in Fig. 1. From this position the operator of the machine then manually swings this end of the table over the top of the rimming press.

In their normal position, the arms 42, as shown in Fig. 3, are not visible above the top of the press and this permits the table to be swung so that it barely avoids engagement with or contacts lightly with the top of the press. The press is then operated by admitting air under pressure through the pipe 30 into the cylinder and the spider 13 is moved downwardly, being guided upon the upright legs 16. As soon as the spider starts downwardly, with the admission of air into the cylinder 19, each of the wear plates 56 and pins 63 is disengaged and the inner ends of the arms are immediately thrown upwardly so that the hooks 58 are swung to a position immediately above the clamping rim 87. In continuation of the downward movement of the spider and piston, the hooks 58 move down to engage the upper rim 87 pressing it tightly against the lower rim, thereby confining the beads in the desired position.

At this period of the operation, the operator inserts the T-bolts 94 through the rim flanges, applies a half-turn thereto and they are removably but firmly secured in place. Air is then admitted to the cylinder 19 through the pipe 33 below the piston, and the spider is raised. This movement causes the hooked ends 58 to move upwardly a short distance to disengage the rims. As the piston approaches its upper limit the wear plate 56 engages the pin 63 and the inner ends of the arms are thrown downwardly about the pivot to a position below the platform, as shown in Fig. 3, the arms remaining so positioned until the next operation commences.

Each time the wear plate and pin are disengaged and the weight throws the ends 58 of the arms upwardly, the latter, under the influence of the compressed springs 54, are elongated. This elongation facilitates the rimming operation of different sized tires and permits the arms to be conveniently collapsed against the spider-member when not in operation.

It will be seen from the above description that I have provided a press which is adapted to operate with relatively little delay and which permits approximately twice as many tires to be rimmed as was previously possible where the rims and tires were assembled directly on top of the press, preparatory to clamping them together. The clamping arms do not interfere with placing or removing rims and tires upon the press, and the clamping operation, as well as the operation causing the disengagement of the arms from the rims, each occurs in one direction of movement of the piston and spider-member.

Although I have illustrated but one form which my invention may assume and have described in detail but a single application thereof, it will be apparent to those skilled in the art that it is not so limited but that various minor modifications and changes may be made therein without departing from the spirit of my invention or from the scope of the appended claims.

What I claim is:

1. A press adapted to clamp rims upon an annular member comprising a supporting frame, a stationary platform rigidly mounted on the frame, a movable support having a plurality of members mounted thereon entirely at one side of the surface of the platform and means for moving a portion of the members beyond the surface into engagement with rims for clamping them together.

2. A rimming press comprising a supporting frame, a stationary platform having an opening therein rigidly mounted on the frame, a plurality of arms normally supported below the surface of the platform, means for actuating the arms downwardly and means for elevating one end of each arm to engage clamping rims at the beginning of the downward movement.

3. A press adapted to clamp rims upon a tire casing comprising a stationary platform having an opening therein, a movable support provided with fluid-pressure operating means and a plurality of arms pivoted to the support, each having a hinge portion adapted to move upwardly through the openings then downwardly to clamp the rims together during movement of the support in one direction.

4. A press adapted to clamp rims upon a tire casing comprising a stationary platform having an opening therein, a movable support provided with fluid-pressure operating means, a plurality of arms pivoted to the support each having a hinge portion adapted to move upwardly through the openings then downwardly to clamp the rims together during movement of the support in one direction and resilient means for returning the hinge to normal position during movement of the support in the opposite direction.

5. A press adapted to clamp rims upon a tire casing comprising a stationary platform having an opening therein, a movable support provided with fluid-pressure operating means, a plurality of arms pivoted to the support each having a hinge-portion adapted to move upwardly through the opening then downwardly to clamp the rims together while the support is moved in one direction, and springs mounted adjacent the hinge portions for returning the latter to normal position while the support is moved in the opposite direction.

6. A press adapted to clamp rims upon a tire casing comprising a stationary platform having an opening therein, a movable support provided with fluid-pressure operating means, a plurality of arms intermediately pivoted upon the support, each arm being provided with a weight at one end, and an abutment on the stationary platform normally maintaining the other end of each arm below the surface of the platform.

7. A press adapted to clamp rims upon a tire casing comprising a stationary platform having an opening therein, a plurality of upright members supporting the platform, a movable support guided on the upright members provided with fluid-pressure operating means, and a plurality of clamping arms intermediately pivoted upon the support.

8. A press adapted to clamp rims upon a tire casing comprising a stationary platform having an opening therein, a plurality of elongate members supported immediately below the platform, means for varying the distance between the respective ends of each member and means for moving the members through the openings into engagement with the rims to clamp them together during downward movement of the support.

9. A press adapted to clamp rims upon a tire casing comprising a stationary platform having an opening therein, a plurality of members supported immediately below the platform each member being composed of a plurality of sections and means for moving the members through the openings into engagement with the rims to clamp them together.

10. A press adapted to clamp rims upon a tire casing comprising a platform having an opening therein, a plurality of elongate sectional members supported adjacent the platform, means for moving the members through the opening into engagement with the rims to clamp them together.

In witness whereof, I have hereunto signed my name.

ROBERT W. SNYDER.